United States Patent Office 2,954,278
Patented Sept. 27, 1960

2,954,278

PRODUCTION OF RUTILE FROM ILMENITE AND RELATED ORES

Arthur John Gaskin, 15 Asling St., Brighton, Victoria, Australia, and Alfred Edward Ringwood, 37 Harold St., Hawthorn, Melbourne, Australia No Drawing. Filed Jan. 31, 1957, Ser. No. 637,349

Claims priority, application Australia Oct. 31, 1956

3 Claims. (Cl. 23—202)

This invention relates to the production of rutile from ilmenite and related ores. The ores to which the process is applicable include most mineralogical varieties of titaniferous iron oxide compounds containing between 20% and 60% titania referred to hereinafter by the general term "ilmenite." Unless the contrary is made clear, reference to the term "rutile" herein is intended to signify microcrystalline titania having the crystal structure of natural rutile although not a naturally produced material.

Although ilmenite ($FeTiO_3$) is known to be much more abundant in Australia and in other parts of the word than the relatively pure natural form of titania known as rutile, the latter is at present preferred as a source material for the production of metallic titanium and in the chlorination process for "titanium white" pigment manufacture.

In the processes in use at the present time for the production of titania from ilmenite, the mineral is completely decomposed and brought into solution by hot sulphuric acid whereafter titania is precipitated by hydrolysis in the form of crystals having the structure of anatase. For most commercial purposes, however, the titania having the crystal structure of natural rutile is preferred so that further treatment is necessary if the product is to be converted to the rutile form. Moreover, chromium, manganese and other deleterious impurities enter the acid solution, making difficult the subsequent precipitation of titania in a pure form. Such contaminants are not readily removed from ilmenite by any simple ore-dressing method and have prevented the utilization of such ilmenite concentrates as, for example, those that have been produced from the beach sand deposits of eastern Australia.

The principal object of the present invention is accordingly to provide an improved method for the production of titanium oxide having the crystal structure of natural rutile from ilmenite ores.

A further object is to enable titania in the rutile form to be extracted by economically practicable procedures from ilmenites containing minerals such as spinels and garnets which are the source of impurities such as chromium and manganese which have hitherto precluded the successful exploitation of ilmenite deposits containing such minerals.

A still further object is to provide a process which can be successfully used with ilmenites which are not suitable for treatment according to the normal process in that they are resistant to acid attack.

Another object is to provide an improved process for the production of titanium oxide in the rutile form from massive ilmenites or titaniferous iron ores such as are known to occur in large quantities in the United States of America and in Canada.

Further objects and advantages of our invention will become apparent as the following description proceeds and the features of novelty which characterize our invention will be pointed out with particularity in the claims annexed to and forming part of this specification.

The above objects are achieved in accordance with the invention by means of a two stage process. In the first stage, ilmenite is heated in a non-oxidizing atmosphere under such conditions that it will decompose into separate phases consisting of microcrystalline rutile and one or more iron-bearing phases.

In one type of process according to the invention the ore is heated for between half an hour and 10 hours in a reducing atmosphere containing carbon monoxide, while in another type of process, the ore is heated in a non-oxidizing atmosphere containing sulphur. The use of sulphur in addition to carbon monoxide in the atmosphere in which the heat treatment is carried out has marked advantages over the use of carbon monoxide alone. For instance, the heat treatment stage is shortened on an average to times considerably less than one hour and the resultant product is easily leached either by sulphuric acid as dilute as 1%, or by an autogenous acid produced by introducing water and compressed air or oxygen into a pressure vessel containing the product.

The second stage of the process comprises the removal of the iron-bearing phase or phases from the heat treated grains and this may be carried out by means of an acid and/or hydrothermal treatment, the conditions of which are so adjusted as to avoid both physical breakdown of the grains and chemical dissolution of the bulk of the rutile contained in the grains. After removal of the iron-bearing phase or phases, the rutile material remains as a more or less clean residue. Resistant impurity minerals containing iron, chromium, manganese, aluminum, silicon and the like in combined form are left as discrete particles in the rutile residue and may be easily separated therefrom by conventional ore-dressing methods, such as magnetic separation, electro-static separation, flotation or tabling.

In a typical process according to the invention, the first stage is the heat treatment of ilmenite grains having an effective diameter between 0.01 mm. and 10.0 mm. in a reactor at a temperature between 650° C. and 750° C. in the presence of carbon, pyrite and sulphur vapour. The proportions of these active components may be varied throughout the complete range relative to one another, but the total amount present must always be sufficient to ensure the absence of free oxygen in the reactor atmosphere. For reasons which will become apparent hereinafter, pyrite is the preferred source of the sulphur in the reactor atmosphere, but, if desired, the sulphur could be introduced as hydrogen sulphide gas, sulphur vapour from boiling elemental sulphur, carbon disulphide vapour, or in the form of any sulphide or similar compound which will decompose in the temperature range used in the process.

After a period which may range from half an hour to 10 hours, the ilmenite grains, which then consist of a microcrystalline intergrowth of aggregates of rutile and one or more iron-bearing phases, are removed from the reactor and cooled, in the absence of free oxygen, to near room temperature.

The second stage of the process is the removal of the iron-bearing phase or phases from the heat treated grains by an acid treatment, and two alternative leach procedures may be used, both of which avoid both physical breakdown and chemical dissolution of the bulk of the rutile contained in the grains.

In one of these procedures, use may be made of 0.1% to 10.0% sulphuric acid at temperatures between 20° C. and 110° C., while in the other procedure, leaching is carried out at pressures of between 20 and 300 p.s.i. at temperatures between 100° C. and 300° C. in a pressure vessel into which water and compressed air or oxygen are introduced. The choice between these alternatives is governed by the amount of sulphur introduced into the ilmenite as it is treated in the reactor during the heat treatment stage. With low sulphur introduction the acid treatment is used, while with high sulphur introduction, the water and air or oxygen treatment above 100° C. gives good results.

For production of highest quality rutile, the product of leaching, consisting of skeletal grains of microcrystalline rutile, the grains still having the same size and shape as those of the original ilmenite feed material, is washed free of fine contaminating particles of sulphur and iron oxide in the range below 10 microns, dried and heated to 400° C. or re-passed through the reactor, and subsequently cleaned with warm concentrated acid.

The product from the leaching stage, in a washed and dried condition, consisting of free-flowing granular material, is then treated by conventional ore-dressing methods to remove minor but highly deleterious grains of mineral contaminants such as chromite, which persist in an undecomposed state through the heat treatment and leaching stages. The unusual physical properties of the skeletal grains of rutile, forming the bulk of the product, allow ore-dressing methods based on density, electrical characteristics and magnetic susceptibility, to be used with great efficiency in this final separation.

In a process of the type in which the ilmenite ore is treated in a non-oxidizing atmosphere containing carbon monoxide as the main active component, the heating is carried out at a temperature of at least 500° C. for a time which depends on the grain sizes and other properties of the raw material, but which may be of the order of an hour or more. After this heat treatment, the treated material is removed from the furnace and cooled without being exposed to the air, and is placed in an acid solution which is of sufficient strength to attack and dissolve the iron-bearing oxide phases contained in the particles of the heat-treated product, yet not sufficiently active to attack and dissolve the bulk of the titanium-bearing phase. A suitable leaching agent is 20% sulphuric acid heated to 100° C., the leaching time being an hour or more, according to the particle size of the material and the required extent to which iron must be removed from the rutile residue. In the leaching, some titanium is dissolved, but this loss may be minimized by reducing the acid concentration and increasing the leaching time. If the acid concentration exceeds 60%, an appreciable loss of titanium occurs by solution although the final rutile product may then be obtained substantially free of iron.

The first stage in the preferred practical procedure according to the invention involves heat treating the ilmenite in the presence of carbon, or carbon monoxide, and sulphur vapour to give an intergrowth of rutile and iron sulphides by means of reactions contained in the following type of equation:

$$FeTiO_3 + S + C \rightarrow FeS + TiO_2 + CO$$

The mechanism of the reaction is not known, but is probably based on an ordering of the ilmenite structure which is known to occur between 500° and 600° C.

The reaction has been studied over the range 550° to 1000° C., using pyrite as the source of sulphur, either mixed with the ilmenite or placed adjacent to it in the same sealed container. The products of the reaction, rutile and iron sulphide-iron oxide phases, have always been very finely intergrown within the original grains of ilmenite. The carbon has been supplied as charcoal or CO, and is used to provide a guard atmosphere against ingress of free oxygen, and at the same time to effect slight reduction of the iron-bearing oxide component of the "ordered" (magnetic) ilmenite above 500° C.

The effect of temperature on the reaction has been studied by heating mixtures of pyrite and ilmenite (in the ratio 4:3) in a closed chamber for 2 hours at temperatures of 550°, 600°, 700°, 750°, 800°, 900° and 1000° C.

To determine the progress of the reaction, the products were leached with 30% sulphuric acid at 100 C. until evolution of $H_2S$ ceased, then washed, dried, and examined microscopically as embedded sections.

Using a reflecting microscope, the progress of sulphidization in ilmenite grains may be followed with ease after the iron phases have been dissolved out with acid. If the reaction is curtailed, the sectioned grains show a sharply defined zone of reacted and leached ilmenite surrounding a core of unaltered ilmenite. With an increase in the time of reaction, or the partial pressure of sulphur vapour, or the temperature if in the range 600°–650° C., the white leached zone in such grain sections advances right through, leaving no cores of unreacted black ilmenite.

Using the above technique, it has been determined that sulphidization sets in at about 600° C. (±10° C.), at which temperature a long reaction period (at least 10 hours) is required to effect a useful degree of breakdown of the ilmenite. At higher temperatures the reaction becomes rapid. Experiments at 650° C., where the partial pressure of sulphur is an appreciable fraction of one atmosphere, give good products in a matter of several hours heating. With short reaction times at this temperature, a marked blue colour is observed in the rutile product, similar to that characterising rutile from long trials at 600° C., possibly due to extreme fineness of such rutile microcrystals.

At 700° C., where $p_S$ is greater than one atmosphere, i.e. free sulphur is blown out of the crucible if excess pyrite is used, the ilmenite breaks down completely in an hour or less. At 800° C. complete reaction has been observed to occur within half an hour.

The upper temperature limit of reaction may possibly be around 1200° C. although the upper limit for practical purposes is around 1000° C. where severe sintering effects prove a problem, and the dangers of increasing the solubility of the titanium components of the products in subsequent solution stages must be anticipated. In addition diffusion of sulphur at these higher temperatures is rapid and catastrophic.

In a particular time-temperature experiment, the sample consisted of 50 grams of ilmenite from the Southport beach sands on the Queensland coast, not specially prepared to be free of non-magnetic grains such as quartz (or even of weakly magnetic zircon and garnet), and containing an average amount of Cr and Mn (each between 0.5 and 10%).

The quantities of pyrite and charcoal mixed with the ilmenite charge were double those required for the reaction, i.e. 50 g. ilmenite, 100 g. pyrite, and 20 g. charcoal. The charge was heated for 4 hours at 720° C. in silica tube with air excluded. The product was loose powder (because of the high initial pyrite content) from which the remaining coarse ⅛" mesh charcoal particles were removed by sieving.

To evaluate the extent of reaction, the product, after sieving, was leached with dilute sulphuric acid (5%), then with 30% hot sulphuric acid after the bulk of the sulphide had been removed.

The product after leaching comprised grey-blue grains of rutile contaminated with black grains of a type of chromiferous magnetite or similar spinel.

The greyish rutile was calcined in air to remove contaminating free sulphur deposited during the acid leaching. This sulphur is formed by oxidation of $H_2S$ during leaching, and becomes embedded in the porous rutile granules. During the calcination, the rutile turned from a grey to a yellow colour as the relic iron was oxidized. After a final wash, the air-dried sample was analysed:

| | Percent |
|---|---|
| $TiO_2$ | 79.9 |
| $Fe_2O_3$ | 4.0 |
| $Cr_2O_3$ | 5.3 |
| MnO | 0.04 |

(The remainder was insoluble material, garnet, quartz, zircon, etc.)

Part of the sample was then passed through a laboratory magnetic separator, which divided the material into pale and dark-coloured fractions. The pale fraction was essentially rutile, contaminated with quartz grains and a small proportion of zircon. The dark fraction contained all the chromiferous-magnetite, some apparently contaminated (incompletely reacted and leached) rutile, garnet of varying composition, and a proportion of the zircon. The dark fraction comprised 18% by weight of the sample passed through the magnetic separator.

Analyses:

|  | $TiO_2$ | $Fe_2O_3$ | $Cr_2O_3$ | MnO |
|---|---|---|---|---|
| Pale Fraction_____percent__ | 89.8 | 0.59 | tr. | tr. |
| Dark Fraction_____do____ | n.d. | 21.70 | 31.2 | .45 |

The chromium and manganese in the pale fraction could not be determined colorimetrically, though present in amounts around 0.01%.

If the quartz and zircon had been removed from the ilmenite before use in this experiment, the figures given above would be increased by about 10%, as the only other components in the above analysis were "insoluble" material and "silica."

In an experiment to determine the proportion of $TiO_2$ recoverable as rutile from an average ilmenite, it was intended to produce complete sulphidization of a magnetically cleaned, pure (98% at least), ilmenite concentrate from the Queensland beach deposits. The sulphidized material was leached with sulphuric acid at different strengths, to estimate the need for severe leaching conditions if low final iron content is to be attained. A minimum leach would give minimum loss of $TiO_2$ by solution, so indicating the extent to which the $TiO_2$ contained in the ilmenite could be converted to rutile.

Quantities:
G.
Ilmenite _____ 44.10
Pyrite _____ 60.00

The above mixture was covered with charcoal, and rested on a layer of charcoal. Time of reaction, 3 hours. Temperature 650°–700° C.

After reaction, the product was leached with 20% sulphuric acid for 1 hour, washed, dried and returned to the furnace mixed with another 30 g. of pyrite. The heating and leaching processes were repeated, the final rutile dried, passed through a magnetic separator, and weighed. Results:

44.10 g. ilmenite produced 21.26 g. rutile.

|  | Percent $TiO_2$ | Percent $Fe_2O_3$ | Percent Insoluble (quartz, etc.) |
|---|---|---|---|
| Ilmenite | 49.3 | 48.8 | 0.5 |
| Rutile | 88.2 | 0.3-0.4 | 10.3 |

(The 10.3% of quartz grains came as impurity in the pyrite used, and would be normally obviated, as the quantities of pyrite estimated in a re-cycling process are only one-tenth of those used in this experiment.)

The calculated recovery of rutile is thus approximately 86% of theoretical, using these double leaching conditions with 20% acid.

In the second stage of the process preferred on economic and technical grounds, the heat treatment products are decomposed in a pressure vessel at a temperature above 100° C. with water and compressed air or oxygen. The pressure at which the reaction is carried out may range between 20 and 300 p.s.i.

Various experiments were carried out in relation to this stage of the process, in a pressure vessel of stainless steel, capacity 500 ml., stirred by a hollow impeller through which the compressed gas is introduced.

The first experiments at temperatures of 125° C. and 160° C. with charges of 14 g. of sulphidized ilmenite, showed that complete breakdown could be attained in ½ an hour with compressed oxygen at a pressure of 25 lb. sq. in., the reaction products being iron oxide, rutile, and fine sulphur, in both experiments. No great difference was found in the products at the two temperatures, except that the high temperature iron oxide seemed coarser and less red in colour. The rutile grains could easily be washed free of the sulphur-iron oxide mixture; all of which lay in the particle size range below 50 microns. Analysis of the clear liquid decanted from the reaction products showed that very little iron sulphate was present (0.26 g. $Fe_2O_3$ per litre), so that sulphur losses in this direction were small.

In other experiments, pressure digestion at 120° C. was investigated at high (100 lb. sq. in.) and low (20 lb. sq. in.) oxygen pressures. At the higher pressure, sulphate losses in solution became appreciable, and the free sulphur liberated was mostly mixed with the iron oxide sludge. At 20 lb. sq. in., however, sulphate production was still minor, and the free sulphur was liberated in the form of globules, all between 1 and 3 mm. in diameter. The amount of globular sulphur removed from the rutile grains and iron sludge by wet sieving, constituted 65% of the total sulphur involved in the digestion, whilst another 5% of sulphur was recovered by heating the dried iron oxide so as to volatilise the trapped sulphur fines.

A sample of a rough concentrate (beach deposit, Queensland, containing about 6% by weight of quartz, garnet, zircon, chrome-magnetite and the like, and 94% ilmenite) was sulphidized by heating at 750° C. for 4 hours in the form of a layer resting on a bed of pyrite in a closed furnace with charcoal admixture and overlying protective charcoal layer. The sulphidization was repeated with fresh pyrite to ensure completion.

From the above reacted material, 26.9 g. were taken and digested for 45 minutes at 120° C. in 450 ml. of water under an oxygen pressure of 60 lb. sq. in.

The digester products were screened, yielding 3.9 g. free sulphur globules, 15.16 g. of discoloured rutile grains, and 9.2 g. of iron oxide fines. The total weight of free sulphur recovered (globules+vapour from fines) was 4.01 g. (approx. 70% of possible).

The discoloured rutile was cleaned by washing with hot 20% sulphuric acid, which removed the adhering iron oxide (about 10% by weight of the rutile) leaving a white granular rutile product.

The extent to which iron may be removed depends on the time and temperature of washing, and to some extent on the strength of acid. Thus various treatments have given total iron oxide values as follows:

Percent
R1($TiO_2$=91.2, $SiO_2$=8.9) _____ 1.7
R2($TiO_2$=88.2, $SiO_2$=10.3) _____ 0.3
R3 _____ 0.2
R4 _____ 0.1

R1 was an acid-leached rutile before passing through a magnetic separator; R2, R3 and R4 were magnetically cleaned samples, leached with increasing severity with 20–30% sulphuric acid.

Reference has been made above to the use of sulphuric acid as a leaching agent at temperatures of between 20° and 110° C., but other suitable acid media may be used if desired. For example, use may be made of hydrochloric acid or a mixture of sulphuric acid and sodium chloride as the leaching medium.

It may also be desirable in some cases to use both the air or oxygen pressure digestion and the acid leaching, preferably in that order. The advantages of the pressure digestion is specific in that it removes iron sulphides of higher sulphur content than FeS. Such sulphides may inadvertently be produced in the roasting and are not amenable to treatment by acid alone. The advantage of the acid leach is also specific in that it removes iron oxides in the Fe-$Fe_3O_4$ range which may be produced by the heat treatment and oxides of the $Fe_2O_3.H_2O$ type produced in the pressure digestion.

The special advantages of the process described above are:

(a) The ilmenite is treated throughout in such a manner as to retain the original particle size. This allows the use of simple sedimentation methods to remove the final products from leach and wash solutions. Rutile grains may thus be easily separated from both contaminated liquors and finely divided by-products of leaching.

(b) The use of carbon and pyrite in the heat treatment stage confers both economic and technical advantages, accelerating the recrystallization of the ilmenite in the reactor, and permitting a degree of control over the composition of the reactor products so that the optimum composition for desired leaching treatment may be obtained for any given ilmenite. Ilmenites vary in nature according to composition and state of weathering, so that a high or low sulphur/carbon ratio can be used in the reactor according to whether the ilmenite is fresh and generally resistant to attack, or weathered and easily recrystallized.

(c) The products from the heat treatment when a high degree of introduction of sulphur has been effected, are particularly easy to treat in the leaching stage. Between 110° C. and 200° C., water and compressed air or oxygen in a closed vessel, decompose the reactor products to rutile, iron sulphate, finely divided iron oxides and sulphur. The rutile may be simply removed from all these by-products by subsequent washing and sedimentation.

(d) The conditions of heat treatment and leaching can be readily designed to keep a minimum the loss, in soluble form, of titania contained in the ore treated. The process avoids appreciable reduction of the ore components, particularly the development of metallic iron and/or an actual compound of iron, titanium, and oxygen in a reduced state, such as occurs in processes worked at higher temperatures. Such a reduced compound tends to pass into solution completely in a subsequent leaching stage, and the advantage of the present process is then largely lost.

(e) Since the principle of the heat treatment stage is to promote the recrystallization of the ilmenite into rutile and an iron-bearing phase soluble in acid within the limits set by the solubility loss of rutile, the process as described permits some latitude in the composition of the iron-bearing phase within limits defining iron/oxygen and iron/sulphur ratios in the iron-bearing material. By variation of the carbon-pyrite ratio in the reactor so as to control the carbon monoxide/sulphur-vapour partial pressure relation, the iron-bearing material from the reactor stage may be caused to have either a composition near FeO or near FeS, or any mixture of these two compounds.

Successful operation of the process may not be attained if reduction much below the composition FeO is brought about near the upper limit of the temperature range specified for the process, nor will it be necessarily attained if compositions of higher sulphur/iron ratio than FeS are developed below a reactor temperature of about 680° C.

(f) The process provides a most specific advantage concerning the treatment of ilmenite concentrates which contain particles of minerals such as spinels and garnets containing chromium and manganese.

In the process according to this invention, the reactor conditions are not severe enough to produce marked chemical or physical alteration of such contaminating minerals. The skeletal grains of rutile produced by the process, have special physical properties such as low bulk density, high internal surface area, low iron content, and high electrical resistivity, all of which combine to make it very easy to attain substantially complete separation of rutile from most contaminating particles by the use of conventional ore-dressing methods. Thus the invention will enable the utilization of beach sand deposits such as those of eastern Australia which can not be treated satisfactorily by known methods because of the presence of contaminating minerals containing chromium and manganese.

We claim:

1. A process for producing rutile from ilmenite which comprises heating ilmenite in granular form in a reactor at a temperature between 500° C. and 1000° C., in the presence of free sulphur vapour, cooling the product in the absence of free oxygen, suspending the cooled product in water, at a temperature of between 100° C. and 200° C. and, while agitating the suspension, blowing free oxygen therethrough at a pressure of between 20 p.s.i. and 100 p.s.i. to produce granular skeletal aggregates of rutile crystals, globular sulphur and a sludge of hydrated iron oxide, and physically separating said rutile aggregates from said sludge and sulphur.

2. A process for producing rutile from ilmenite which comprises sulphurizing ilmenite at a temperature between 500° C. and 1000° C., cooling the product in the absence of air to a temperature in the range between 100° C. and 200° C., suspending the product in water in said temperature range and, while agitating the suspension, blowing free oxygen therethrough at a pressure between 20 p.s.i. and 100 p.s.i. to produce granular skeletal rutile aggregates which are free of substantial contamination with iron oxide.

3. A process for producing rutile from granular material containing ilmenite and impurity minerals which comprises heating the granular material in a reactor at a temperature between 500° C. and 1000° C. in the presence of carbon and sulphur vapour, cooling the product in the absence of free oxygen, suspending the cooled products in water, at a temperature of between 100° C. and 200° C. and, while agitating the suspension, blowing free oxygen therethrough at a pressure of between 20 p.s.i. and 100 p.s.i. to produce granular skeletal aggregates of rutile crystals, globular sulphur, the impurity minerals and a sludge of hydrated iron oxide, and physically separating said rutile aggregates from said sulphur, sludge and impurity minerals.

References Cited in the file of this patent

UNITED STATES PATENTS

| 1,206,796 | Barton | Dec. 5, 1916 |
| 1,348,843 | Barton | Aug. 10, 1920 |
| 1,542,350 | Whittemore | June 16, 1925 |
| 2,058,480 | McCallum et al. | Oct. 27, 1936 |
| 2,127,247 | Dawson | Aug. 16, 1938 |

FOREIGN PATENTS

| 275,579 | Great Britain | Nov. 24, 1927 |